Dec. 29, 1942.   W. E. LINDSTROM ET AL   2,306,965
APPARATUS FOR MOLDING ARTICLES
Filed Sept. 18, 1939   4 Sheets-Sheet 2
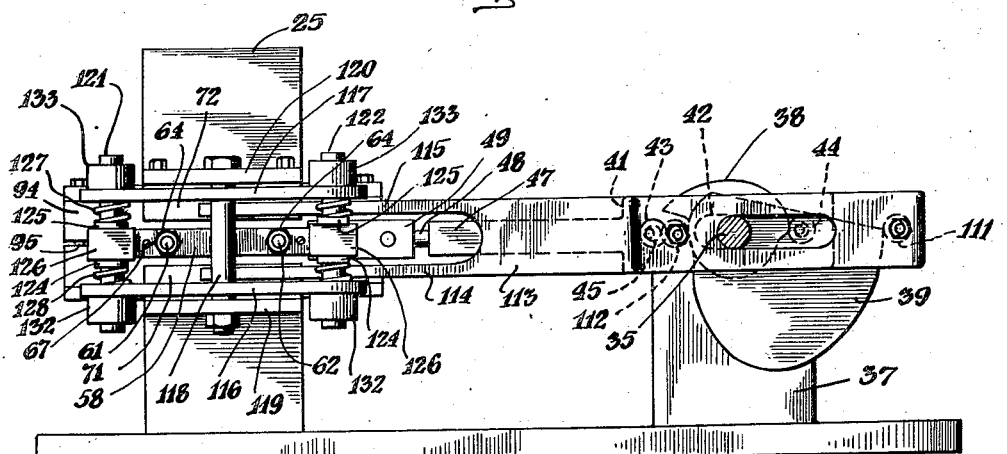
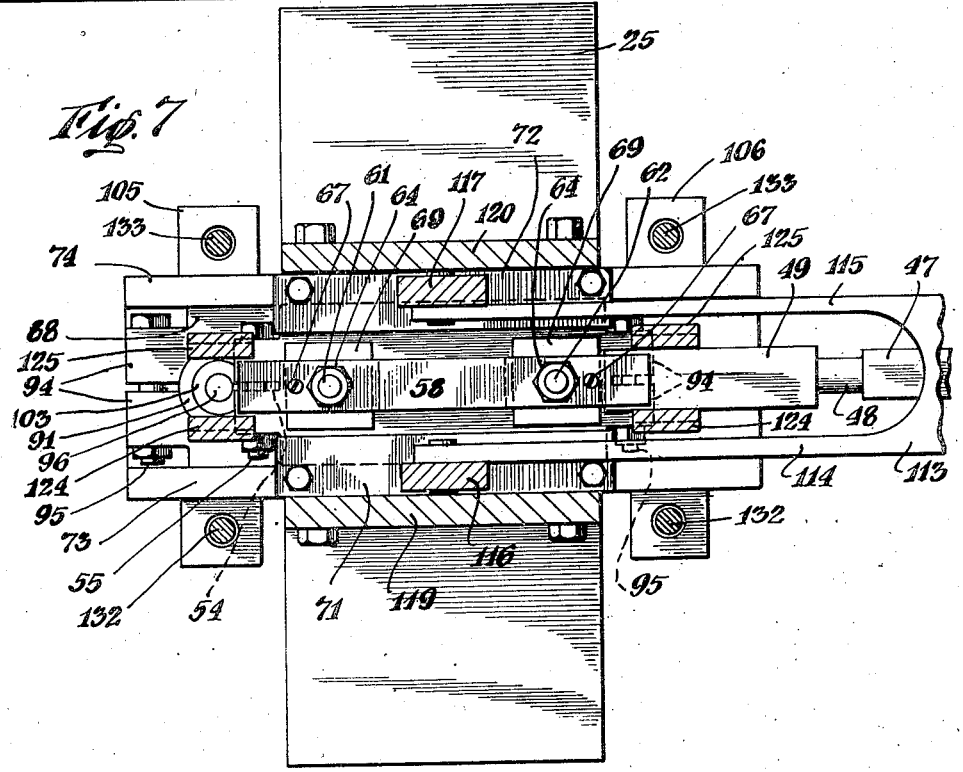
INVENTORS
Wilfred E. Lindstrom
BY Gordon V. B. King
Cooper, Kerr and Dunham
ATTORNEYS Dec. 29, 1942.     W. E. LINDSTROM ET AL     2,306,965
APPARATUS FOR MOLDING ARTICLES
Filed Sept. 18, 1939     4 Sheets-Sheet 3
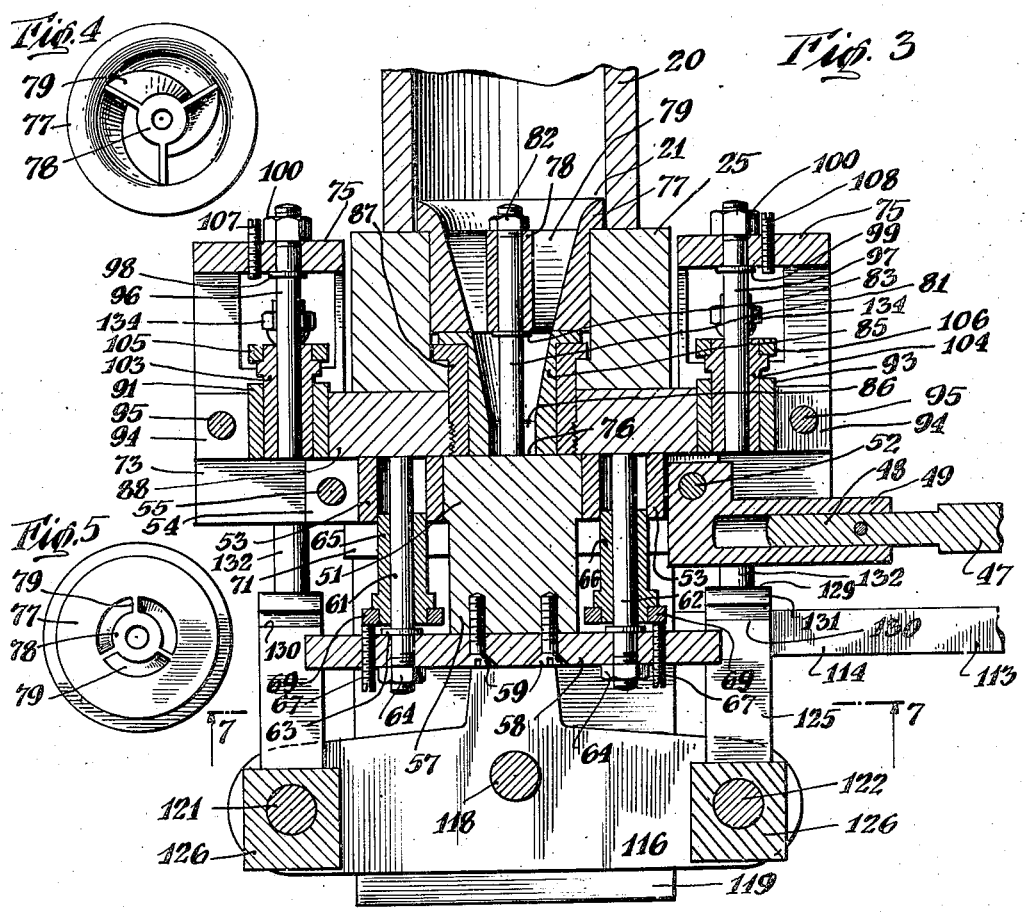
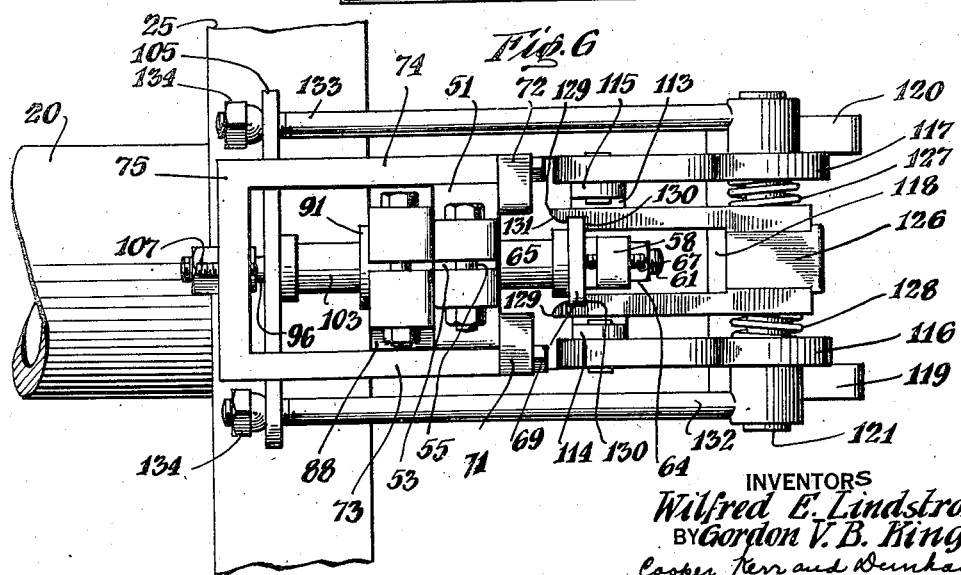

Dec. 29, 1942.  W. E. LINDSTROM ET AL  2,306,965
APPARATUS FOR MOLDING ARTICLES
Filed Sept. 18, 1939   4 Sheets-Sheet 4
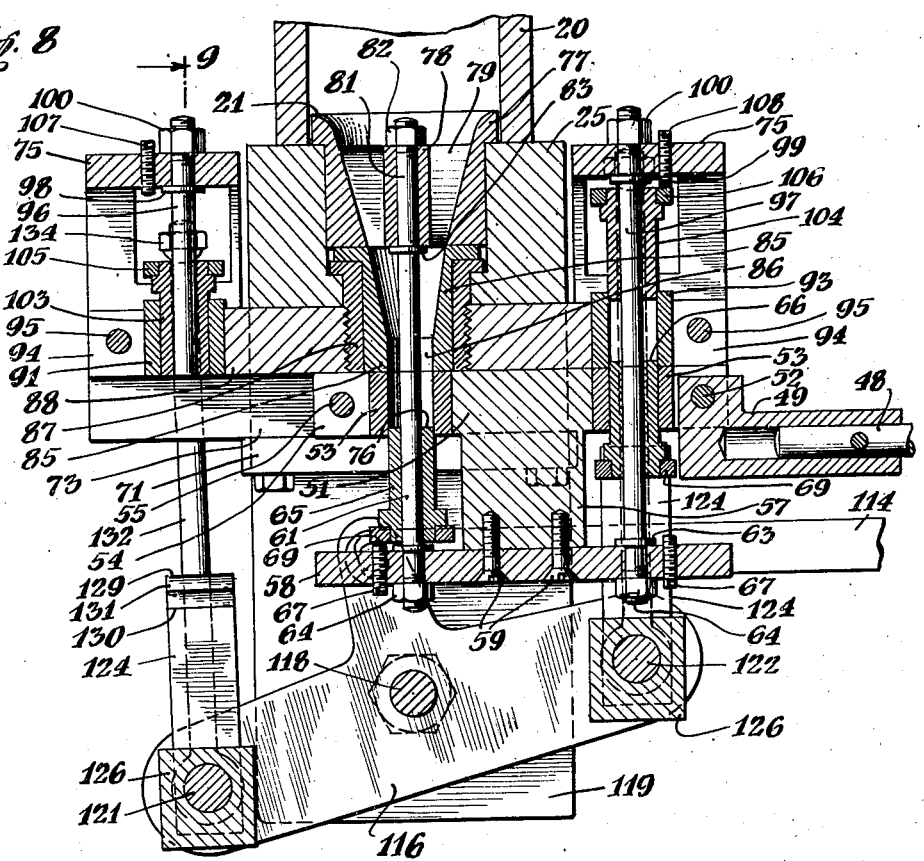
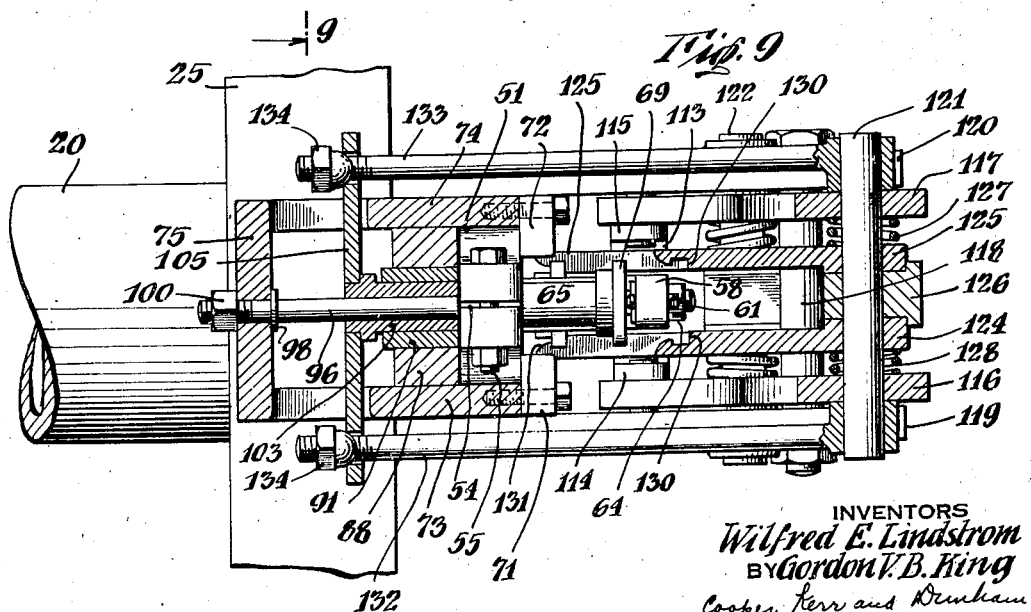
INVENTORS
Wilfred E. Lindstrom
BY Gordon V. B. King
Cooper, Kerr and Dunham
ATTORNEYS Patented Dec. 29, 1942

2,306,965

UNITED STATES PATENT OFFICE 2,306,965

APPARATUS FOR MOLDING ARTICLES

Wilfred E. Lindstrom, Oradell, and Gordon v. B. King, Convent, N. J., assignors to Lindstrom and King, West Caldwell, N. J., a partnership composed of Wilfred E. Lindstrom and Gordon v. B. King Application September 18, 1939, Serial No. 295,426

3 Claims. (Cl. 18—5)

This invention relates generally to the manufacture of formed or molded articles and has particular reference to improvements in apparatus for manufacturing such articles.

One object of the invention is to provide a simple durable mechanism for manufacturing articles from a plastic material at a high rate of production and which will give uniformity of product within very close tolerances.

Another object of the invention is to provide a mechanism which can readily be changed to manufacture different sizes of the same article or articles of a different character within, of course, reasonable limits.

With the foregoing and other objects in view the invention consists in a novel combination and relation of parts, one embodiment of which is hereinafter described with reference to the drawings accompanying and forming a part of this application, the novel features being pointed out in claims appended hereto.

In said drawings:

Fig. 2 is an end view of the apparatus.

Fig. 3 is a horizontal section through the compression throat and molding apparatus with the parts shown in an intermediate position.

Fig. 4 is a detail of the construction of the entering side of the compression or extrusion throat.

Fig. 5 is a view, looking in the opposite direction, of the construction illustrated in Fig. 4.

Fig. 6 is a view along the line 6—6 of Fig. 1.

Fig. 7 is a view along the line 7—7 of Fig. 3.

Fig. 8 is substantially the same as Fig. 3, the principal difference being that in Fig. 8 the parts are shown in the positions they occupy when they have been moved to complete the molding and compression of one of the articles.

Fig. 9 is a view along the line 9—9 of Fig. 8.

Figure 1:
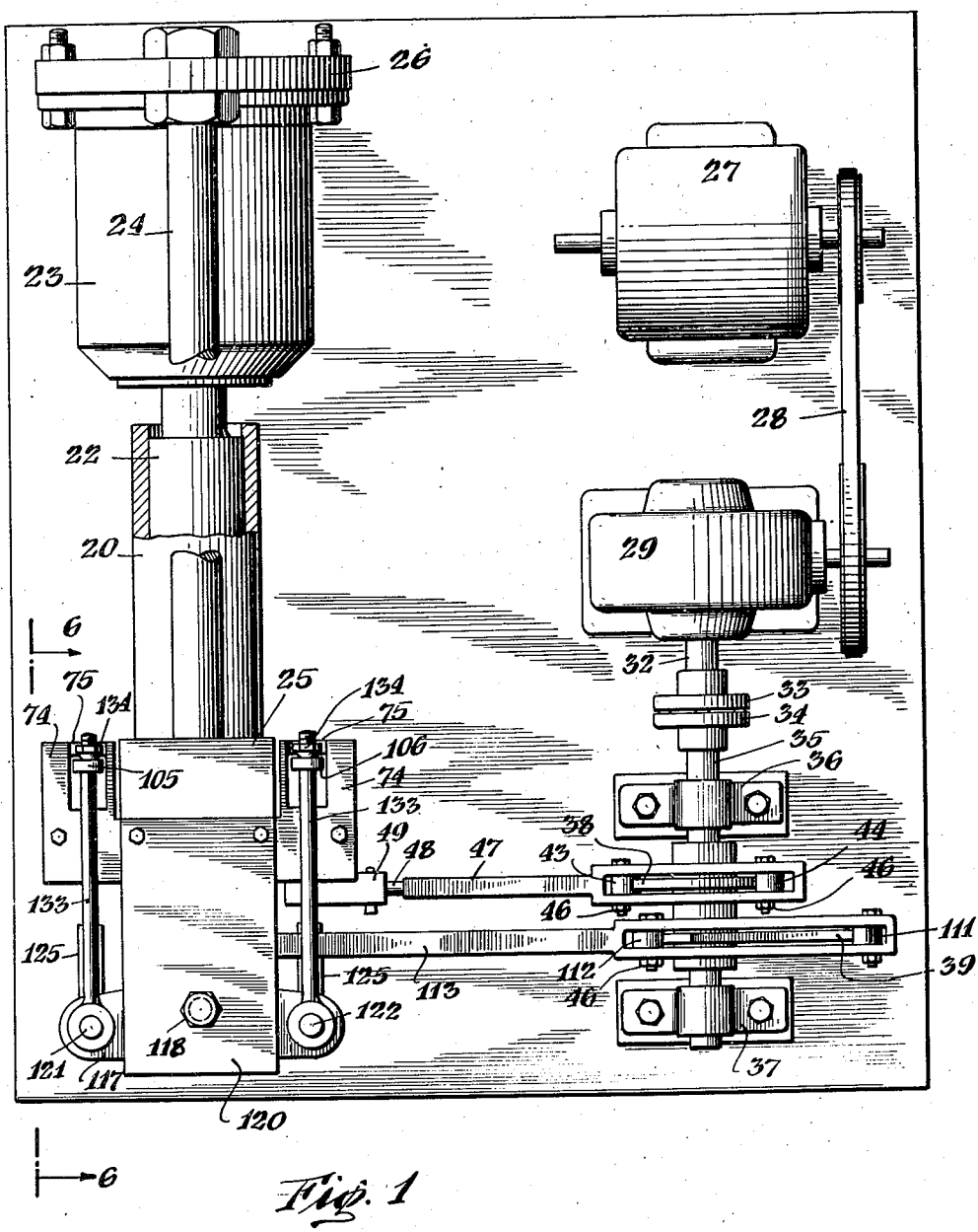
Fig. 1 is a top plan view of an installation embodying the inventions.

The machine shown in the drawings is designed specifically for making valve packing rings used in steam and other valves and which can be compressed by adjustment of a gland nut or similar part to form a seal around the valve stem. The material employed for this purpose consists, by weight, of asbestos fiber about 60%, powdered graphite about 30%, and about 10% of rubber or other suitable binder. These amounts can be varied within certain limits as great exactness is not required. The materials mentioned are mixed and worked together with naptha or some other solvent which readily evaporates, the amount of solvent being about the same by weight as the amount of rubber, that amount of solvent being sufficient to produce a stiff plastic material which will maintain its shape after molding and compression until the solvent is evaporated to leave the finished article.

The plastic material is supplied in cylinders 20 which may be interchangeable so that a filled cylinder may be ready to replace one which has been emptied. The filled cylinder has sufficient clearance at one end, as shown in Fig. 8, to engage over the rim 21 of an extrusion throat construction, while the other end receives a ram or piston 22, Fig. 1. This piston is part of a compression device such as a hydraulic jack designated generally at 23 capable of exerting a heavy pressure, for example, 6000 pounds per square inch, applied through the piston 22. After the cylinder 20 has been set in position strong bolts or rods 24, only one of which is shown in the drawings, are set to take up the strain exerted between a heavy block 25 and a strong plate 26 back of the compression device 23. While the device 23 is preferably a hydraulic jack, any suitable way of applying a heavy pressure to the plastic material may be employed.

The mechanism for molding and compressing the plastic material into the finished article may be driven in any suitable way but in the drawings (Fig. 1) these parts are shown as being driven by an electric motor 27 connected by a belt or chain 28 to a reduction or change speed gear box 29. The power transmitted through the gear box drives a shaft 32, preferably connected by members 33 and 34 of any suitable construction to another shaft 35 journaled in bearing members 36 and 37. Attached to the shaft 35 are two cams 38 and 39. The first mentioned of these cams is for driving what is herein usually referred to as the mold slide or as the forming mold carrier and the second cam is for operating mechanism which transfers the molded articles from the forming molds to compression molds and then both compresses the articles in the compression molds and ejects them therefrom as hereinafter described.

Cooperating with the cam 38 is a slide operating member 41 which is constructed to form a rectangular portion surrounding the cam and which has its sides slotted as indicated at 42 (Fig. 2) to surround the shaft 35. Mounted within the rectangular opening in the member 41 are two rollers 43 and 44 cooperating with the periphery of the cam 38. These rollers turn upon eccentrics carried by members 45 (Fig. 1) which can be turned and then fastened in position by the nuts 46, thereby affording a means for accurately regulating the relation of the rolls with the cam to get exactness of movement of the slide or mold carrier.

Integral with the rectangular portion 41 of the slide operating member is an arm or rod 47 having a reduced portion 48, Figs. 3 and 8, pinned or otherwise suitably connected to a member 49 forming a part of the connections for operating the mold slide. The member 49 is loosely pivoted upon a bolt 52 (Fig. 3) which is also used for another purpose as hereinafter explained. It is apparent that when the member 49 is reciprocated by the cam 38 all of the parts free to move with the member 49 will be reciprocated.

These movable parts are best illustrated in Figs. 3 and 8, and include a plate 51 which is constructed to receive two forming mold members, 53. The plate is cut away as shown at 54, Fig. 9, to provide jaws which can be drawn together by the bolt 52 at one side and a bolt 55 at the other side to hold the molding members 53 firmly in position. Secured to the plate 51 is a block 57, although this may simply be a projection from the plate 51. Fastened across the front of the block 57 is a plate 58. This plate is strongly fastened as at 59 (Fig. 8) to the block 57 and plate 51 because it must take a tolerably heavy strain in the operations hereinafter described.

Fastened in the plate 58 are two rods 61 and 62. These rods are preferably provided with flanges 63 at one side of the plate and are drawn against the plate by nuts 64 at the other side of the plate. These rods serve as guides for members 65 and 66 constituting movable parts of the forming molds and also serve as cores to give hollow centers to the molded articles.

The members 65 and 66 slide along the rods 61 and 62, the movement in one direction being limited by stops 67 adjustable in the plate 58, the inner ends of the stops cooperating with members 69 integral with and forming flanges on the ends of the members 65 and 66.

The plate 51 and all of the parts carried thereby are limited to a close sliding movement by guides 71 and 72, Figs. 3, 8 and 9, bolted to frame members 73 and 74 which are in turn secured to a frame member 75 forming a part of the stationary frame work of the apparatus.

The purpose of reciprocating the plate 51 is to bring the molding members 53 alternately in alignment with the exit opening 76 of what is for convenience referred to herein as the extrusion throat. That throat is made up of several members constructed and arranged to afford a ready interchange of parts. The first of these parts is a member 77 having an inverted frusto-conical interior. Mounted within the surface of the member 77 is a member 78 provided with curved wings or vanes 79 integral with the body of the member 78. Extending through that body is a rod 81 held in position centrally of the member 78 by a nut 82 drawing a flange 83 on 81 firmly into engagement with the member. The purpose of the vanes 79 is to distribute or lay the material above the exit 76, thereby causing a better placement of the fibrous plastic than if the vane construction was not used. Below the member 77 is another member 85 also having an inverted frusto-conical interior which is substantially a continuation of the interior of the member 77 to afford a further compression and laying of the plastic material. The conical interior of the member 85 terminates at its lower end in a cylindrical or tubular interior 86. The rod 81 carried by the vaned member 78 serves as a centering and forming core within the tubular portion 86 to which reference has just been made. The member 85 is seated in a member 87 which is threaded into a plate or bar 88 attached to the frame member 25.

When the plate 51 has been shifted to the position in which it is shown in Fig. 8, the left hand mold member 53 will be in alignment with the cylindrical portion 86 or the exit opening 76 from the extrusion mechanism and the distributed and laid plastic will be forced within the mold member 53. As it is forced in it will cause the movable member 65 to be driven along the rod 61 until the movable member is arrested by its stop 67. This insures a firm close filling of the interior of the mold member 53. When the plate 51 and the mold members are shifted, for example, to the left from the positions in which the parts are shown in Fig. 8, the plastic will be sheared off by the relative movement of the mold member 53 and the member 87, and the face of the plate 51 will seal off any extrusion from the throat 76 until another mold member is brought in alignment with that throat.

Cooperating with each of the mold members 53 is a forming and compression mold 91 or 93 held within suitably shaped seats by clamps 94 and bolts 95 at the sides of the plate 88, that plate, as previously indicated, being a part of the stationary frame work of the mechanism.

Centered within the forming and compression molds 91 and 93 are rods 96 and 97 held by flanges 98 and 99 and nuts 100 in the framing of the machine. Slidable on the rods 96 and 97 are members 103 and 104 closely fitting the interiors of the mold members 91 and 93. Each of the members 103 and 104 has reduced portions closely fitting within bars 105 and 106 (Figs. 6 and 9) forming parts of ejecting devices hereinafter described more in detail. Cooperating with these bars are adjustable stops 107 and 108 to limit movement of the members 103 and 104 in one direction.

When one of the filled forming molds 53 is brought opposite its associated compression mold 91 or 93, the member 65 or 66 in the forming mold is moved endwise in the mold to transfer the formed article from the forming mold into the compression mold and, by a further movement of the member 65 or 66, the material is compressed within the forming mold, this transfer and compression causing movement of the member 103 or 104 until arrested by the associated stop 108, the movable member 65 or 66 being forced into the interior of the compression mold to compress the plastic material. It can be stated here that after the article is fully compressed and finished within the mold, the member 65 or 66 is withdrawn from the compression mold and the forming mold then shifted out of alignment with the compression mold and the compressed article then ejected by driving the member 103 or 104 through the interior of the compression mold 91 or 93.

The mechanism for effecting the transfer of the formed article from a forming mold to the compression mold will next be described. This mechanism is operated by the cam 39 previously mentioned. That cam is surrounded by a rectangular construction similar to the construction of the member 41 and acts through rollers 111 and 112 to reciprocate a plate 113 (Figs. 2 and 7) which is constructed to provide arms 114 and 115 constituting driving members for what is usually hereinafter referred to as the rocker arms. These rocker arms are three-armed members 116 and 117, Figs. 3, 7, 8 and 9, pivoted upon the shaft of a bolt 118 extending between top and bottom plates 119 and 120 of the frame work for the mechanism. One arm of each of the rocker arms is pivotally connected to the corresponding arm 114 or 115. When the slide operating member 113 is reciprocated by the cam 39 acting upon the rolls 111 and 112 the rocker arms 116 and 117 are oscillated in unison around the center 118. The other arms of the rocker arms 116 and 117 carry between them bolts or rods 121 and 122 and upon these bolts or rods are mounted connections for actuating the members 65 and 66 to transfer articles from the forming molds 53 to the compression molds 91, 93 and compress them; and the mechanism for ejecting the compressed articles from the compression molds.

When the plate 51 and the forming molds have been shifted so as to align one forming mold 53 with the extrusion throat 76, the other forming mold 53 will be in alignment with the associated compression mold and rocker arms 116 are then actuated to drive the member 66, for example, into the compression mold 93. This transfers the formed article from the forming mold into the compression mold and an added or continued movement of the member 66 effects the compression of the article within the interior of the compression mold 93 and against the adjacent end of the member 104.

The movement of the member 66 is effected by a pair of arms 124 and 125 journaled upon the rod 122 carried by the rocker arms and seated in slots in the top and bottom faces of a spacing member 126 secured to the rod 122. Between the rocker arms 116 and 117 and the arms 124 and 125 are springs 127 and 128 surrounding the rod 122 and serving to hold the parts in proper relation on the rod.

The ends of the arms 124 and 125 are provided with rounded ends 129, Figs. 3, 6 and 9, and shoulders 130, these shoulders acting against the flange 69 on the member 66 to drive that member along the rods 61 and 62.

The cams 38 and 39, Figs. 1 and 2, are so constructed and are so positioned relatively on the shaft 35 that after the plate 51 is shifted to align one of the forming molds with the extrusion throat and the other forming mold with the associated compression mold, the rocker arms 116 and 117 will be swung to engage the shoulders 130 with the flange 69 and force the compression member 66 into the compression mold, thereby driving the formed material ahead of it and compressing it in the compression mold. As the arms 124 and 125 are driven into engagement with the flange 69 by oscillating movement of the rocker arms 116 and 117, the arms will be separated slightly against the tension of the springs 127 and 128 as the rounded ends 129 pass over the flange. After the compression is effected, the rocker arms 116, 117 are then swung in the opposite direction and shoulders 131 of the arms 124, 125 will withdraw the members 66 from the compression mold in order to free the forming mold carrier plate 51 for a shifting movement by the cam 38.

Withdrawal of the member 66 and shift of the forming mold carrier 51 away from the compression mold 93 permits ejection of the compressed article from the compression mold. This ejecting movement is also effected by the oscillation of the rocker arms 116 and 117. The mechanism for effecting it is illustrated in the various figures, being particularly shown in Figs. 6 and 9, in both of which the parts associated with the left hand compression mold 91 appear in detail. As there illustrated, the rod or bolt 121 carries two links 132 and 133 extending rearward and passing through holes in the bar 105 previously mentioned. When the rocker arms 116 and 117 are swung through the intervening connections by the cam 39 the bar 105 will be drawn toward the front of the machine carrying with it the member 103. Nuts 134 on the links 132 and 133 constitute a means for regulating the length of the stroke of the member 103 when the rocker arms are oscillated. The movement of the member 103 is sufficient to drive the formed article out of the compression mold 91 into a container or onto a conveyor (not shown) conveniently arranged to permit evaporation of any solvent remaining in the article.

The apparatus has been described in considerable detail and it is thought to be clear that the present embodiment is intended to fill the forming molds 53 alternately and that the transfer of the formed article in one of the forming molds to the associated compression mold is effected while the other forming mold is being filled at the compression throat 76. That is to say, the plate 51 and the forming molds 53 are then shifted in such a way that when a filled mold 53 is brought into alignment with its compression mold the empty forming mold will be aligned with the extrusion throat. As one of the forming molds is brought opposite its compression mold the member 65 or 66 is impelled by the arms 124, 125 to transfer the formed article into the compression mold and the material compressed in that mold. Thereafter the member 103 or 104 as the case may be is operated as above indicated to eject the finished article from the compression mold.

From all of the foregoing it is obvious that the mechanism can be changed by substitution of parts to manufacture articles of different sizes and that the internal configuration of the forming and compression molds may be changed to produce articles of shapes other than the valve packing rings for which the specific apparatus shown and described is designed. It is therefore not desired to be limited to the disclosure of the specification and drawings except to the extent indicated in the claims which follow.

What is claimed is:

1. A machine for molding valve packing rings comprising in combination an extrusion press having a throat through which a stiff plastic is extruded under heavy pressure, a plurality of preliminary molds, a carrier for said preliminary molds constructed between the molds to close the press throat, means for operating said carrier to align the forming molds successively with the throat to receive the extruded material and form partially pressed articles in the molds, a final compression mold for each preliminary mold, means for transferring the molded articles from the preliminary molds to the respective compression molds and further compressing the articles in the latter molds, means for ejecting the compressed articles from the compression molds, and rods mounted centrally of the press throat, the preliminary molds and the final compression molds for forming and maintaining through the successive operations the openings through the centers of the valve packing rings.

2. An apparatus for molding valve packing rings comprising an extrusion press for extruding a stiff plastic through a throat, preliminary molds for receiving the plastic from the press and each having a centrally disposed rod, a slide carrying said preliminary molds movable to position said molds opposite the press throat and close said throat when no mold is opposite said throat, final molds each having a centrally disposed rod, means for ejecting the molded plastic from the preliminary molds into the final molds while the rods in the preliminary and final molds are in axial alignment and finally compressing the plastic in the final molds and around the rods therein, and means for stripping the formed packing rings from the rods in the final molds and ejecting them from the final molds.

3. An apparatus for the purpose stated comprising an extrusion press for applying heavy pressure to a stiff plastic material and having a throat through which the material is expelled, a rod supported centrally of and extending to the mouth of the throat, a member slidable across the mouth of the throat having unrecessed portions confining the plastic against the pressure of the press and preliminary mold cavities into which the plastic is ejected and molded by the released pressure when one of said cavities is brought into alignment with the press throat, a rod supported centrally of each preliminary mold cavity, said rods being in axial alignment with the rod in the press throat when the respective preliminary mold cavities are in alignment with the throat, members slidable in one direction on the preliminary mold cavity rods by the plastic and stops therefor to limit the amount of plastic formed in the preliminary molds, final molds, rods supported centrally of each of the final molds, and means for actuating the slidable members first to slide the formed plastic off of the rods in the preliminary molds and on the rods in the final molds and then into the compression molds to compress the plastic in the final molds, and means for stripping the completed articles from the final mold rods and ejecting them from said final molds.

WILFRED E. LINDSTROM.
GORDON V. B. KING.